(12) United States Patent
Vicente

(10) Patent No.: US 9,123,257 B2
(45) Date of Patent: Sep. 1, 2015

(54) DEVICE FOR FACILITATING DETECTION OF HYGIENIC HAND WASHING

(71) Applicant: Julio Vicente, Rochester, NY (US)

(72) Inventor: Julio Vicente, Rochester, NY (US)

(*) Notice: Subject to any disclaimer, the term of this patent is extended or adjusted under 35 U.S.C. 154(b) by 306 days.

(21) Appl. No.: 13/694,861

(22) Filed: Jan. 11, 2013

(65) Prior Publication Data

US 2013/0206054 A1    Aug. 15, 2013

Related U.S. Application Data

(60) Provisional application No. 61/632,113, filed on Jan. 18, 2012.

(51) Int. Cl.
| | |
|---|---|
| *G08B 21/24* | (2006.01) |
| *E05B 1/00* | (2006.01) |
| *A61L 2/18* | (2006.01) |
| *G09B 19/00* | (2006.01) |

(52) U.S. Cl.
CPC .......... *G09B 19/0076* (2013.01); *E05B 1/0069* (2013.01); *G08B 21/245* (2013.01)

(58) Field of Classification Search
CPC ......... E05B 1/00; E05B 1/0069; C08B 21/24; A01L 2/18
USPC .......... 116/200, 211; 222/191, 192, 631, 632, 222/633
See application file for complete search history.

(56) References Cited

U.S. PATENT DOCUMENTS

| | | | | |
|---|---|---|---|---|
| 4,832,942 A | * | 5/1989 | Crace | 428/41.1 |
| 4,971,375 A | * | 11/1990 | Grecco | 292/347 |
| 5,288,116 A | * | 2/1994 | Donofrio | 292/336.3 |
| 5,467,481 A | | 11/1995 | Srivastava | |
| 5,713,614 A | * | 2/1998 | Anderson | 292/336.3 |
| 6,029,600 A | | 2/2000 | Davis | |
| 6,147,607 A | * | 11/2000 | Lynn | 340/573.1 |
| 6,211,788 B1 | * | 4/2001 | Lynn et al. | 340/573.1 |
| 7,307,051 B2 | | 12/2007 | Rich | |
| 8,408,423 B1 | * | 4/2013 | McKnight et al. | 222/192 |
| 8,636,177 B1 | * | 1/2014 | Gardiner et al. | 222/192 |
| 2009/0071975 A1 | * | 3/2009 | Stropkay et al. | 222/1 |
| 2010/0294806 A1 | * | 11/2010 | McDowell | 222/173 |
| 2014/0346194 A1 | * | 11/2014 | Oshmyansky | 222/192 |

FOREIGN PATENT DOCUMENTS

| | | | | | |
|---|---|---|---|---|---|
| FR | 2824096 A1 | * | 10/2002 | | E05B 1/00 |
| GB | 2402622 A | * | 12/2004 | | A61L 2/18 |
| GB | 2436284 A | * | 9/2007 | | E05B 1/00 |
| GB | 2500400 A | * | 9/2013 | | E05B 1/00 |
| GB | 2506386 A | * | 4/2014 | | A61L 2/18 |
| JP | 2012183324 A | * | 9/2012 | | A61L 2/18 |
| WO | WO 02055817 A1 | * | 7/2002 | | A61L 2/18 |
| WO | WO 2007135424 A1 | * | 11/2007 | | E05B 1/00 |
| WO | WO 2008040965 A2 | * | 4/2008 | | E05B 1/00 |
| WO | WO 2011128652 A2 | * | 10/2011 | | E05B 1/00 |

* cited by examiner

*Primary Examiner* — R. A. Smith
(74) *Attorney, Agent, or Firm* — Fred L. Denson

(57) ABSTRACT

A door mountable device for facilitating detection of hygienic hand washing. A dye dispenser is mounted on a door handle in a manner such that a soap washable dye is deposited on hands that contact the handle upon entry into a restroom facility. The resulting dye stain area is removed by thorough hand washing. Any stain remaining upon exiting the restroom is an indicator that hands have not been hygienically washed.

13 Claims, 11 Drawing Sheets

DEVICE FOR FACILITATING DETECTION OF HYGIENIC HAND WASHING

BACKGROUND OF THE INVENTION

1. Field of the Invention

The present invention relates to a door mountable dye dispensing device that facilitates the detection of hygienically washed hands.

2. Description of the Prior Art

Over the past several years, the public has become increasingly aware of the importance of hand hygiene. Studies conducted during this period have shown that there is a direct relationship between hand hygiene and the spread of common germs (such as influenza, staph aureus, salmonella, e. coli, etc.) that cause a broad range of illnesses from the common cold to more serious infectious diseases. Major health organizations, health care establishments and the health science community have implemented programs and policies, and have taken steps to encourage or facilitate improvements in hand hygiene. The American Medical Association (AMA) has adopted a resolution calling for AMA publications to urge not only professionals, but also the general public to adopt hand washing as an important personal priority. In adopting this resolution, the AMA has noted that hand washing can be the first line of defense against many infectious diseases as well as against respiratory and gastrointestinal disorders. The United States Food and Drug Administration, the United States Department of Agriculture and other governmental agencies have also noted the importance of hand hygiene in relation to food safety.

Various policies, procedures, practices and equipment have been developed and used to combat the transmission of germs by non-hygienic hands. Gloving is generally required in restaurants and other facilities involved in food preparation. Gloving is also required in areas of health care facilities where there is direct patient contact. Automatic hand washing systems have gained popularity in many industries including health care facilities and food service establishments. Detection devices have also been developed which sense the presence or absence of residual cleansing material on hands and provide visual or audio alarms to signal detection of any residual material.

"Guideline for Hand Hygiene in Health-Care Settings", a paper by John M. Boyce, M.D. and Didier Pittet, M.D., published in the *Morbidity and Mortality Weekly Report* (51 (RR16), 1-44) by the Center for Disease Control (CDC), includes a description of measures that have been, or should be taken to improve hand hygiene, and performance indicators for ascertaining the effectiveness of these measures. Included among these measures is monitoring the volume of alcohol-based hand rub or detergent used for hand washing or hand antiseptic over a fixed period of time. These Guidelines also point out the variations in quality of hand washing, i.e., some hands are subjected to a very thorough washing with a cleansing liquid while others are minimally rinsed with a small quantity of cleansing liquid.

Hand washing measures, monitoring devices and other equipment associated with hand hygiene or its detection are relatively expensive and tend to add to the ever-increasing cost for health care. When such equipment is not available for use because of cost or other reasons, hand washing is generally accomplished by using a liquid cleansing material from a dispenser or by applying alcohol or other anti-germ solution by an alternative means. When this method is used, the quality of the washing becomes an issue because washing times, techniques and thoroughness vary from individual to individual as pointed out in the CDC Guidelines. Moreover, it is difficult or impossible to determine whether individuals have engaged in any hand washing at all.

Hand hygiene is of particular concern with regard to the use of restrooms. The importance of hand washing in conjunction with restroom use cannot be over emphasized. Notices reminding users of this importance are conspicuously posted in restrooms of health care facilities, food service establishments, places of public accommodation and the like. However, there are few acceptable means for monitoring or detecting whether a user has washed his or her hands, or the quality of such hand cleansing after restroom facility usage. In most cases, it is impractical to use automated hand washing equipment or detection devices in such settings. Moreover, legal restrictions related to privacy issues prevent the use of available inexpensive electronic surveillance equipment such as cameras for monitoring hand washing in a restroom.

Soap washable dyes as well as other chemicals which may be applied to hands either before or during hand washing, have been used to facilitate in determining the hygienic status of hands. U.S. Pat. No. 5,467,481 to Srivastava, describes the use of dyes for this purpose. A user of gloves is reminded to wash his or her hands after taking off the gloves, by using a glove having an interior surface with a hand-coloring that transfers onto the wearer's hand during use and remains on the hand after the glove is removed, in an amount sufficient so that it is visible on the hand. The colorant is removed by washing. While this invention may be useful to practitioners in health care settings, it is not applicable to users of restroom facilities since gloves are not normally worn in restroom settings.

U.S. Pat. No. 7,307,051 to Rich, discloses a color changing hand soap composition that includes a pH indicator. Hands are washed until the pH indicator changes color. The composition enables the user to determine when hand washing is sufficient based on the change in the alkalinity of the washing liquid from acidic to basic as determined by its pH. This invention is useful only during the hand washing process. There is no remaining coloration after the user's hands have been rinsed and dried. Therefore, when the user leaves the restroom facility, there is no hand coloration and thus no visible means for detecting whether the user's hands have been washed.

U.S. Pat. No. 6,029,600 to Davis, discloses a device which reminds restroom users to wash their hands. Dye is sprayed on a user's hand when he or she uses a handle or knob to open a restroom door. A spray pump containing the dye is attached adjacent to the door handle and is activated when the handle is turned. The dye deposited on the user's hands is removed by hand washing before leaving the restroom facility. While the device facilitates the detection of hand hygiene by the use of dye, its use is problematic because of the difficulty of confining the spray to the user's hands. It is not unlikely that some dye-containing spray may be deposited on the user's clothing, the entrance door, the floor or other unintended areas. Moreover, installation and connection of a spray pump to an existing door handle could require extensive modifications to the door. Safety is also a consideration since the spray pump requires an electrical connection in a water-prevalent restroom area. Ongoing maintenance is another disadvantage because of the mechanical linkage and other moving parts associated with the pump and handle and their connection. Such arrangements are often prone to become maintenance intensive.

It is therefore an object of this invention to provide a means that facilitates the detection of hygienically washed hands in relation to restroom usage.

It is a further object of this invention to provide a means that facilitates the detection of the quality and thoroughness of the hygienic washing of hands in relation to restroom usage.

It is yet another object of this invention to provide an efficient, reliable and inexpensive means that facilitates the detection of hygienically washed hands in relation to restroom usage.

It is an additional object of this invention to provide a means that is easily installed at a restroom entrance to facilitate the detection of hygienically washed hands in relation to restroom usage.

SUMMARY OF THE INVENTION

These and other objects are achieved by the use of a novel device that dispenses and applies an indicator liquid to the fingers and/or palm of a hand used to open a door to a restroom facility so that a stained area of the hand remains after contact. The device is mounted on the entrance door at a location that requires contact with a user's hand in order for the user to gain entry. The indicator liquid is preferably a fast drying dye solution that is removable from the stained area by a thorough hygienic washing. The stained area is visibly detectable should the user fail to engage in hygienic washing before leaving the restroom. It also serves as a self-reminder for those users who may have inadvertently forgotten to wash their hands. The door dispenser and applicator device of this invention includes a means for detachably mounting the device on a door having a handle as well as to a door without a handle. It is attachable to a door handle by means of a chassis or collar that secures the device to the handle. A suitable adhesive is used to attach the device to a door that does not have a handle or to a door that uses a push plate. The device minimally includes a) a reservoir which contains a supply of dye or other suitable indicator liquid, and b) an applicator which is in communication with the liquid in the reservoir in a manner such that liquid is able to freely flow from the reservoir to the applicator. As a part of the device, the applicator is positioned at a location on the door to ensure that a user's hand must contact it to gain entrance to the restroom. The flow of liquid from the reservoir to the applicator is facilitated by the pressure or force applied to it by a user who enters the restroom. This also helps the applicator to retain sufficient liquid for deposit on the hand of the user.

The device comprising the invention is usable with a wide variety of door handles, doorknobs, door plates and the like. It is easily installed on existing doors or can be included as an integral part of a manufactured door opening means. It is cost efficient and easily maintained particularly since it contains no moving parts. Essentially little or no maintenance is required other than replenishing the supply of liquid contained in the reservoir or replacing the applicator from time to time. The hygienic benefits derived from use of the device far outweigh the minimal costs and time required for its fabrication and maintenance. In addition to facilitating detection of whether hands have been washed, it also is useful for detecting the quality or thoroughness of hand washing. The dye stain area is completely removed for hands that have been thoroughly washed but is only partially removed when the quality of the washing is less than thorough.

DETAILED DESCRIPTION OF PREFERRED EMBODIMENTS

Figure 1:
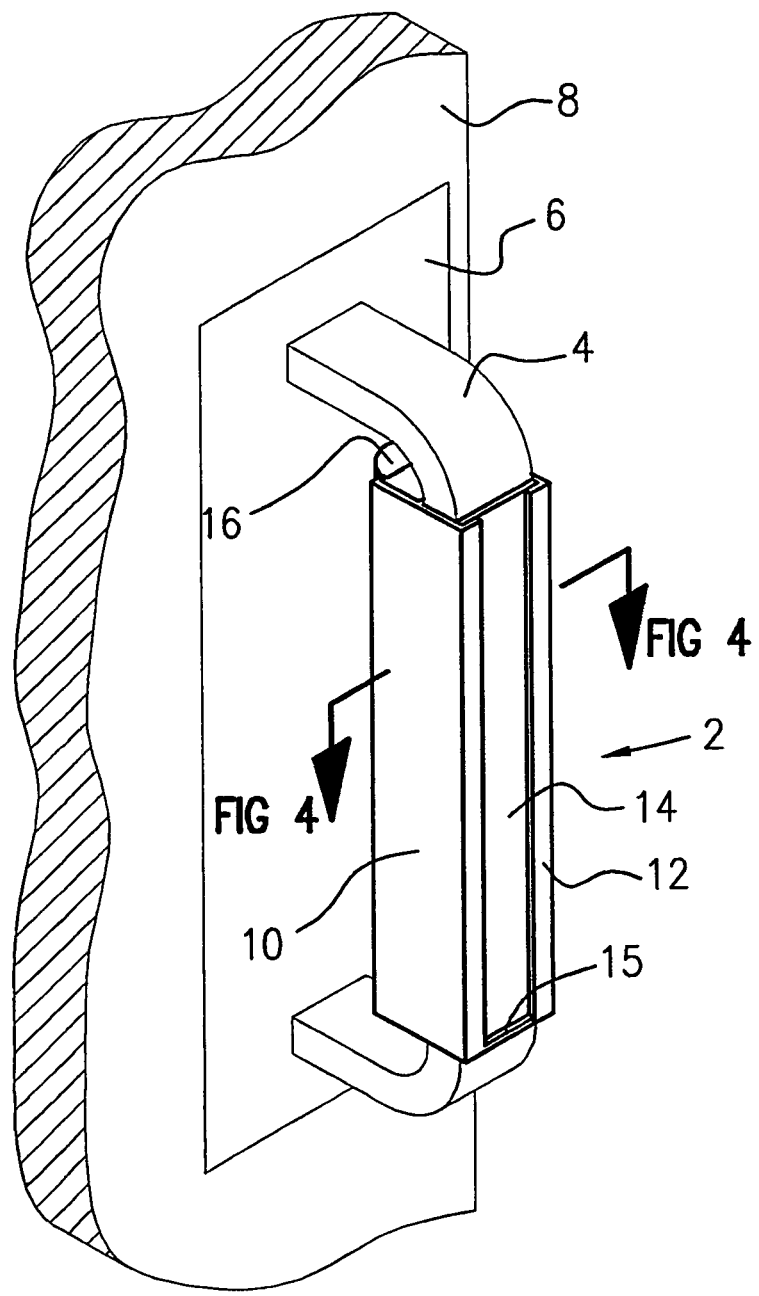
FIG. 1 is an isometric view of the indicator liquid dispenser of this invention as mounted on a door handle.
Figure 3:
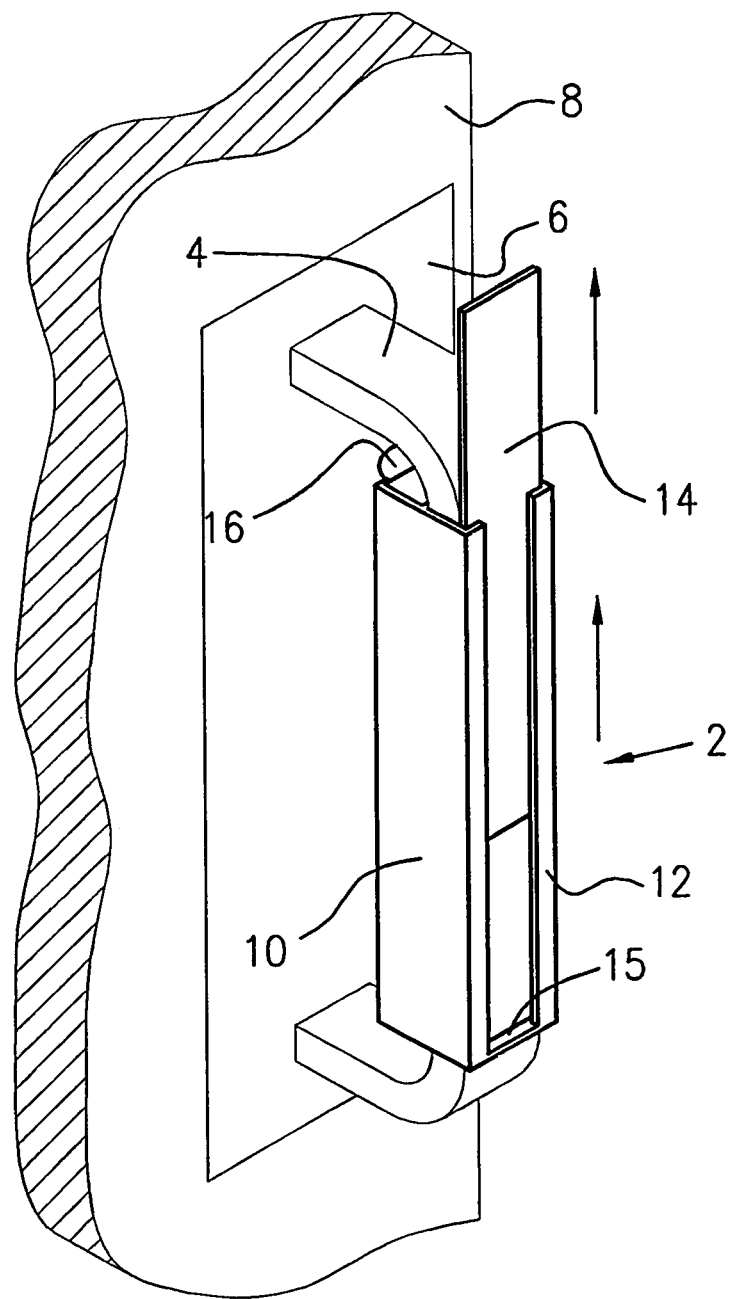
FIG. 3 is an isometric view of the mounted dispenser of FIG. 1 showing a partially removed dispenser retainer plate.
Figure 4:
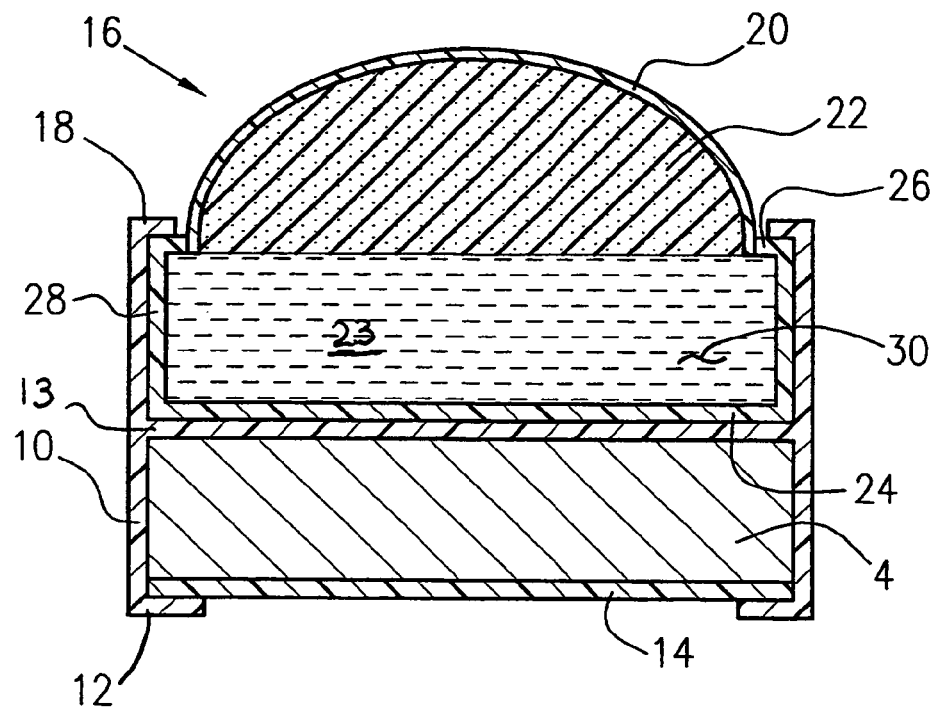
FIG. 4 is a cross section view taken along the cross section line of FIG. 1.
Figure 6:
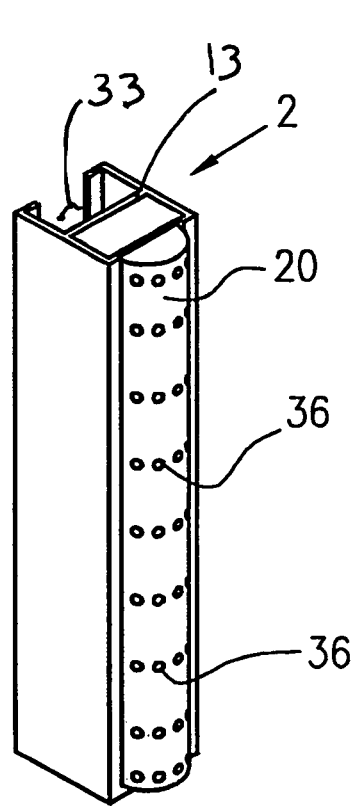
FIG. 6 is an isometric view of the door handle dispenser of FIG. 1 when detached from the door handle.
Figure 7:
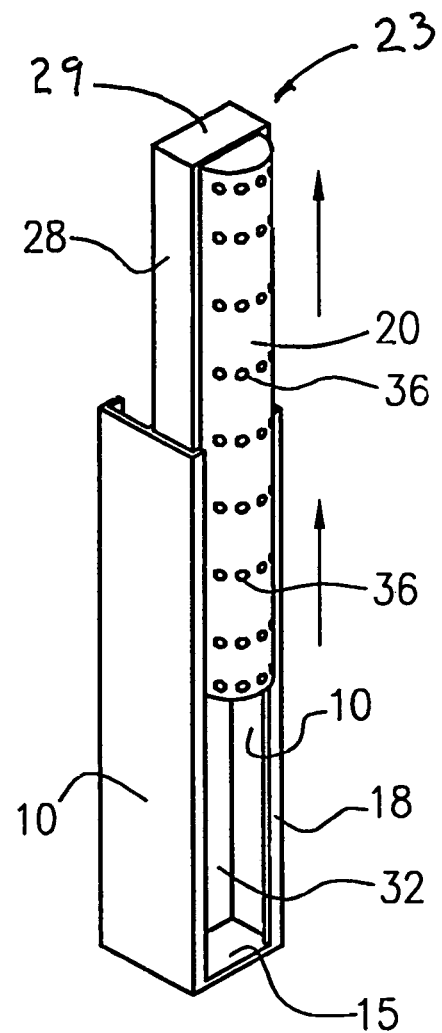
FIG. 7 is an isometric view of the door handle dispenser of FIG. 6 showing the indicator liquid reservoir partially removed from the dispenser.

As shown in FIGS. 1, 3 and 4, door handle dispenser 2 is mounted on door handle 4 that is attached to handle support plate 6. Support plate 6 is affixed to door 8 and is positioned at a location where such plates are usually positioned on entrance doors to restrooms. Dispenser 2 includes a dual channel chassis having a pair of oppositely disposed flanged side walls 10. Flanges 12 and 18 extend inwardly along the length of each side wall. Each side wall 10 is joined to petition wall 13 that is positioned between the side walls in a manner such that a chassis is formed having first channel 32 and second channel 33 as shown in FIGS. 6 and 7. Reservoir 23, which is positioned within first channel 32, has a bottom 24, a pair of oppositely disposed side walls 28, flanges 26 that extend inwardly along the length of each side wall, and a pair of oppositely disposed end walls 29 (FIG. 7). Indicator liquid 30 is stored within reservoir 23. Applicator assembly 16 is positioned atop the reservoir 23 between the edges of inwardly extending flanges 26. As shown in FIG. 4, applicator assembly 16 includes applicator 22 that is encased within curved cover 20. Cover 20 contains a set of perforations 36 that form openings through the cover.

Second channel 33 is defined by the lower part of flanged side walls 10 and petition wall 13 which separates first channel 32 from second channel 33. Removable retainer plate 14, which is oppositely disposed to wall petition 13 at the bottom of second channel 33, is held in place by flanges 12. The size and shape of second channel 33 is compatible with the size and shape of handle 4 so that the device is removably mounted to handle 4 by encasing it in second channel 33 and sliding retainer plate 14 into its retaining position between the surface of handle 4 and flanges 12. The compatibility in size and shape provides a snug fit when dispenser 2 is mounted onto door handle 4.

The door handle dispenser of this invention is prepared for use by filling reservoir 23 with indicator liquid 30 and covering it with cover 20 containing applicator 22. Indicator liquid 30 is typically a water soluble dye that is removable from human skin surface by thorough washing with soap and water. Any fast drying dye having a color that is visually detectable when present on the skin surface is suitable for use. Applicator 22 consists of any material that is capable of absorbing and retaining indicator liquid 30 from reservoir 23 such as a sponge. Cover 20 is typically fabricated from a flexible plastic material such as polyethylene, polypropylene or other inert material that is not affected by indicator liquid 30. The size of perforations 36 in cover 20 is sufficient to allow passage of indicator liquid 30 there through and typically ranges from about 0.1 cm to about 2.0 cm in diameter. Applicator assembly 16 and reservoir 23 containing indicator liquid 30 are secured in first channel 32 by side walls 10, petition wall 13, end wall 15 and flanges 18. Additional fastening means (not shown) may be used to further secure the position of these items. Door handle dispenser 2, with applicator assembly 16 and filled reservoir 23, is attached to door handle 4 by encasing the handle in second channel 33. The dispenser is secured in place on handle 4 by retaining plate 14 which is inserted between the external surface of handle 4 and flanges 12. Additional means (not shown) to further secure the dispenser to the handle may be used.

Figure 2:
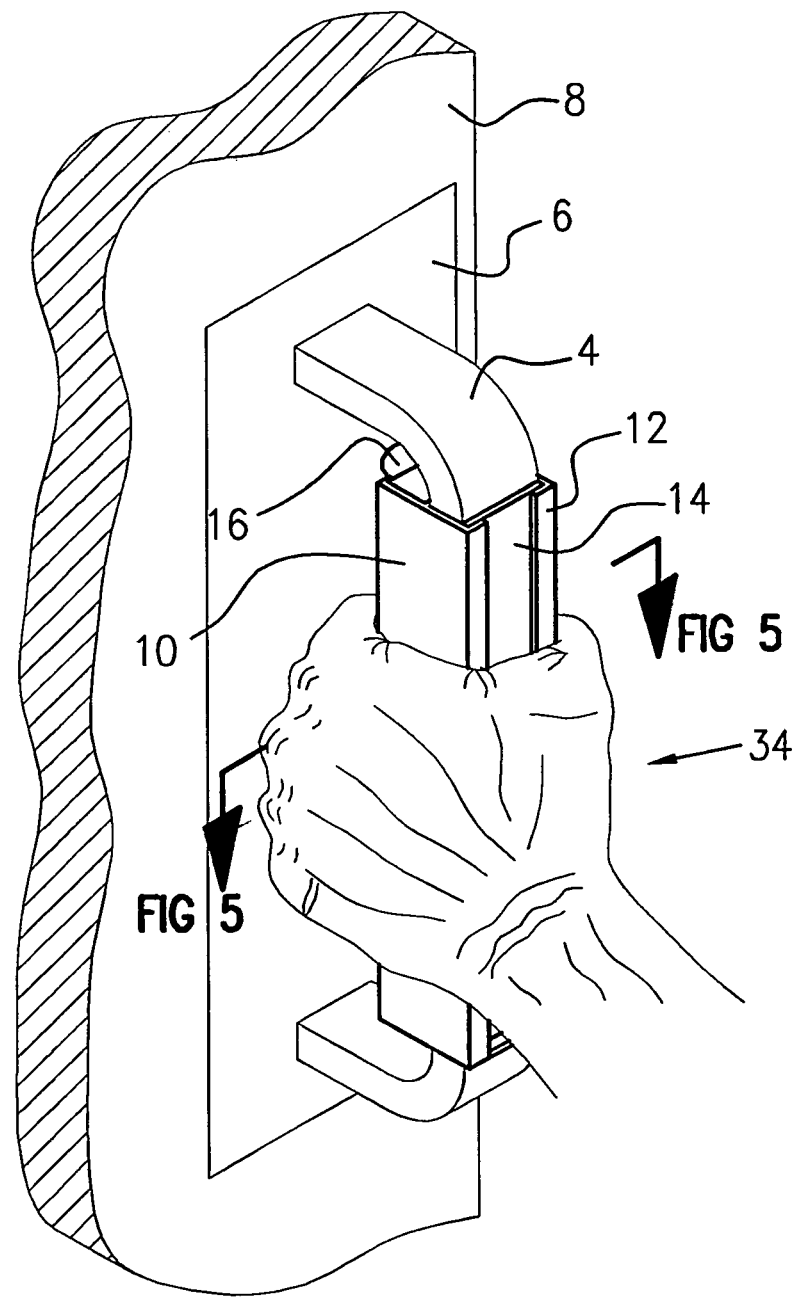
FIG. 2 is an isometric view of the mounted dispenser of FIG. 1 showing the grasping position of a hand on the door handle while opening the door.
Figure 5:
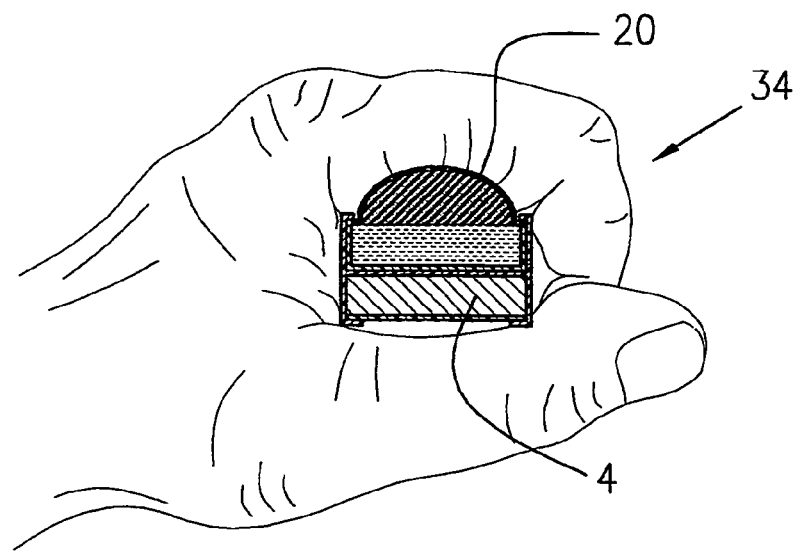
FIG. 5 is a cross section view taken along the cross section line of FIG. 2.
Figure 8:
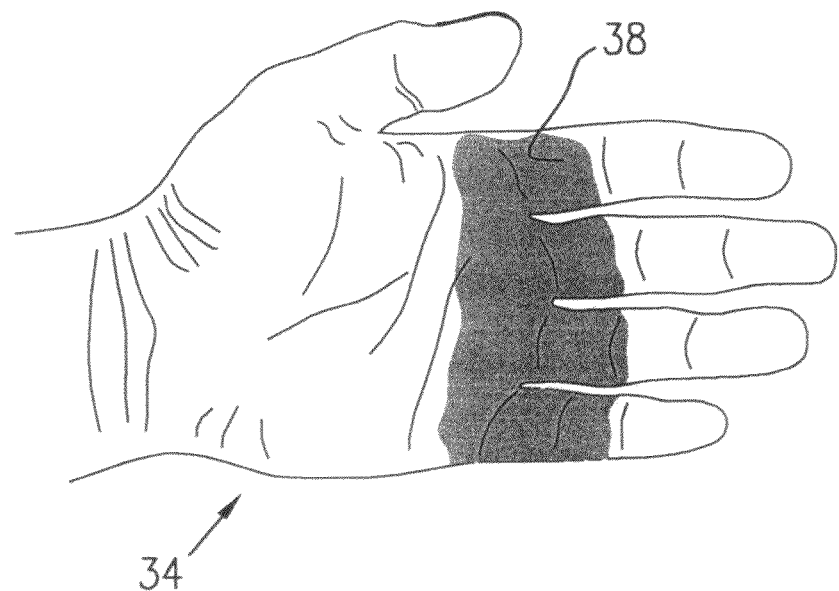
FIG. 8 is a planar representation of the hand shown in FIG. 2 with a dye stained area.

When deployed for use, dispenser 2 is mounted on handle 4 of restroom entrance door 8. As shown in FIGS. 2, 5 and 8, a user opens door 8 by grasping handle 4 with hand 34 in a manner such that portions of the fingers and palm contact cover 20. Indicator liquid 30, having passed through aperture 36 and deposited on the surface of cover 20, comes in contact with the fingers and palm of hand 34 leaving an area 38 of visible dye stain on the surface of the user's skin. Depending on the size of the apertures, the viscosity of the indicator liquid and the absorption properties of the applicator as well as other variables, the indicator liquid flows from reservoir 23 to the surface of cover 20 with the application of little or no external force. However, the rate of flow of indicator liquid is facilitated by force applied by hand 34 when used to open door 8. This creates pressure on cover 20 which is transferred through applicator 22 to liquid 30 in reservoir 23. Any pressure applied to liquid 30 in reservoir 23 provides a pumping action which causes additional liquid 30 to flow through apertures 36 in cover 20.

The area where the dye is deposited on the palm or fingers of hand 34 is readily visible to the human eye and is removable only by thorough hand washing. Upon exiting the restroom, a user who has not washed their hands before leaving the restroom is easily detectable by reason of the presence of the dye color stain on the palm and finger areas of the hand.

Figure 9:
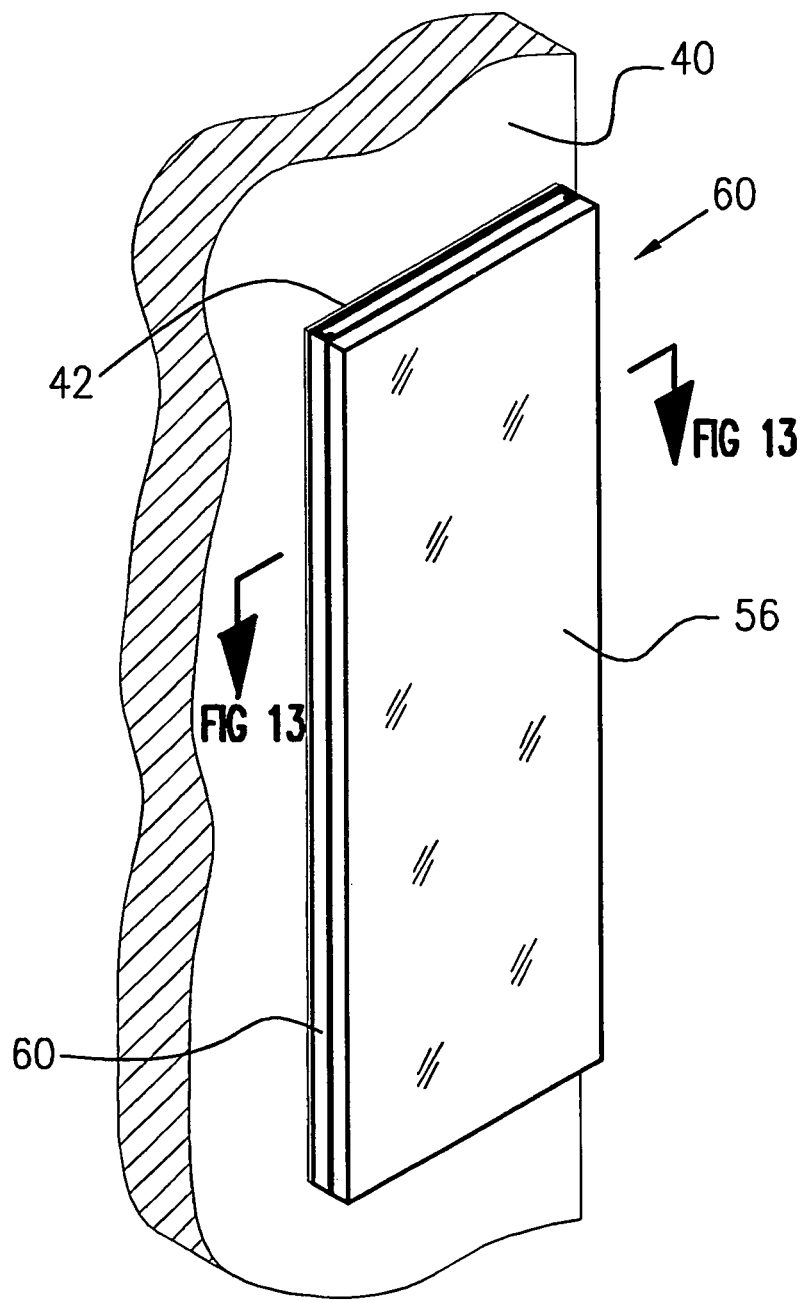
FIG. 9 is an isometric view of the indicator liquid dispenser directly attached to a door surface.

While the dispenser of this invention has been described for use with door handles, it is also suitable for use on doors that do not have handles. FIGS. 9 through 14 show this embodiment of the invention. As shown in FIG. 9, door plate dispenser 60 is affixed to door 40 by adhesive 42 which is typically an adhesive tape having adhesive material on both sides of the tape. Door plate dispenser 60 includes chassis 51 and applicator assembly 57 as shown in FIG. 11. Chassis 51 is formed by a pair of oppositely disposed chassis side walls 46, chassis end wall 47 and chassis base 50. Applicator assembly 57 includes a) reservoir 62 having a pair of oppositely disposed side walls 52, a pair of oppositely disposed end walls 64, reservoir base 44 and reservoir cover 48; and b) applicator 56 which is attached to reservoir cover 48. Reservoir 62 contains a quantity of indicator liquid 54 such as a commercially available dye solution. Reservoir cover 48 contains a series of perforations 58 that pass through reservoir cover 48. The cover is made from any flexible plastic material such as polyethylene, polypropylene or other suitable material that is not affected by indicator liquid 54. The diameter of perforations 58 ranges from about 0.1 cm to about 2.0 cm. The same type of indicator liquids previously described as being suitable for use with door handle dispenser 2 shown in FIG. 2 are also suitable for use with door plate dispenser 60 shown in FIG. 9.

Applicator assembly 57 is removably attached to chassis 51 by sliding the assembly between the chassis side walls 46 onto the chassis base 50. Applicator assembly 57 is removed when it is necessary to replenish indicator liquid 54 stored in reservoir 62. When applicator assembly 57 with replenished reservoir 62 is reinserted into chassis 51, it is held in place by chassis side walls 46, end wall 47 and base 50.

Figure 10:
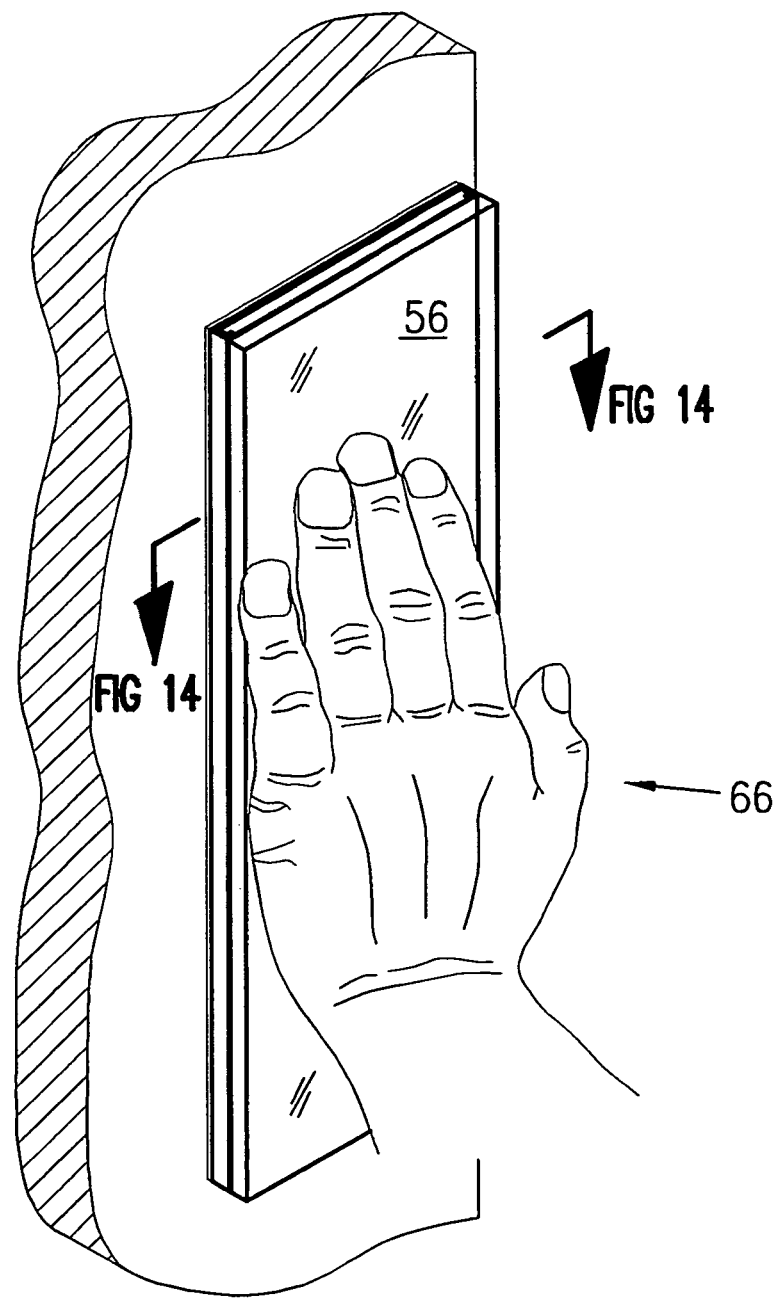
FIG. 10 is an isometric view of the mounted dispenser of FIG. 9 showing the pushing position of the hand on the dispenser for the purpose of opening the door.
Figure 11:
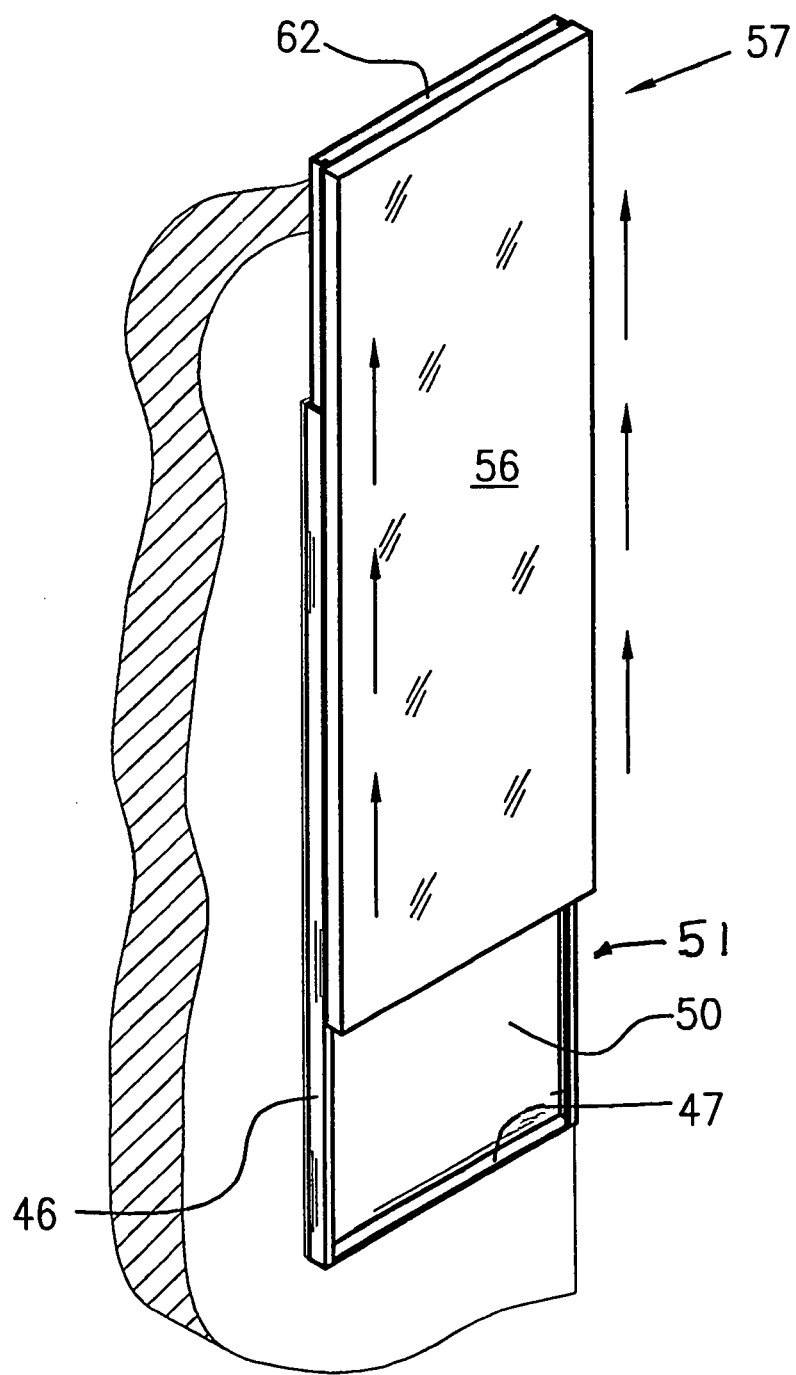
FIG. 11 is an isometric view of the mounted dispenser of FIG. 9 showing a removed plate application assembly that is partially removed from its chassis.
Figure 12:
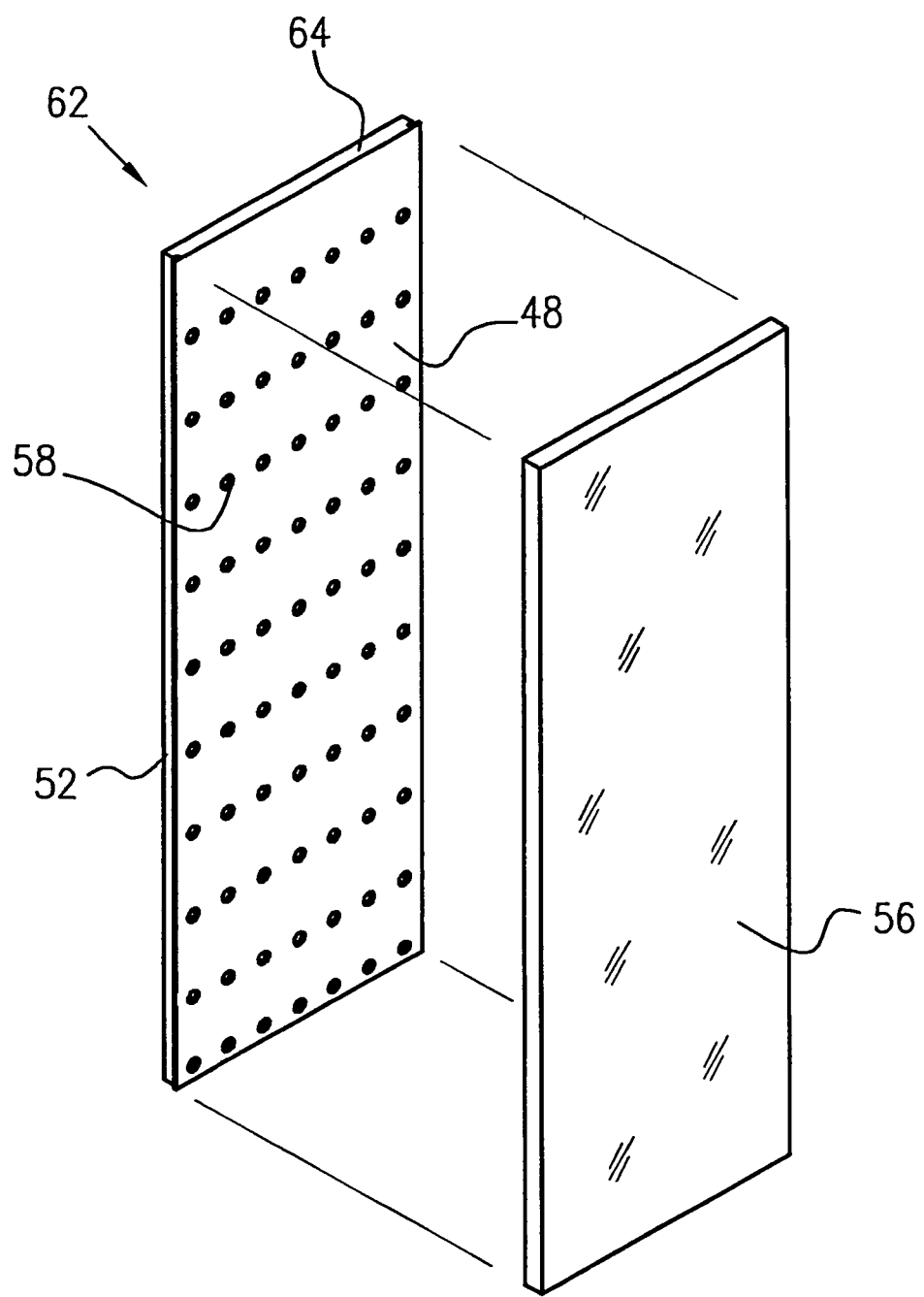
FIG. 12 is an isometric view of the reservoir and applicator components of the applicator assembly shown in FIG. 11.
Figure 13:
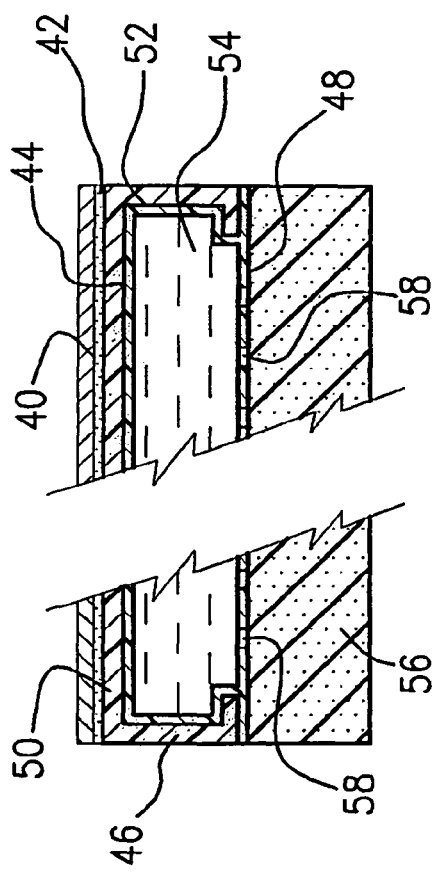
FIG. 13 is a cross section view taken along the cross section line of FIG. 9.
Figure 14:
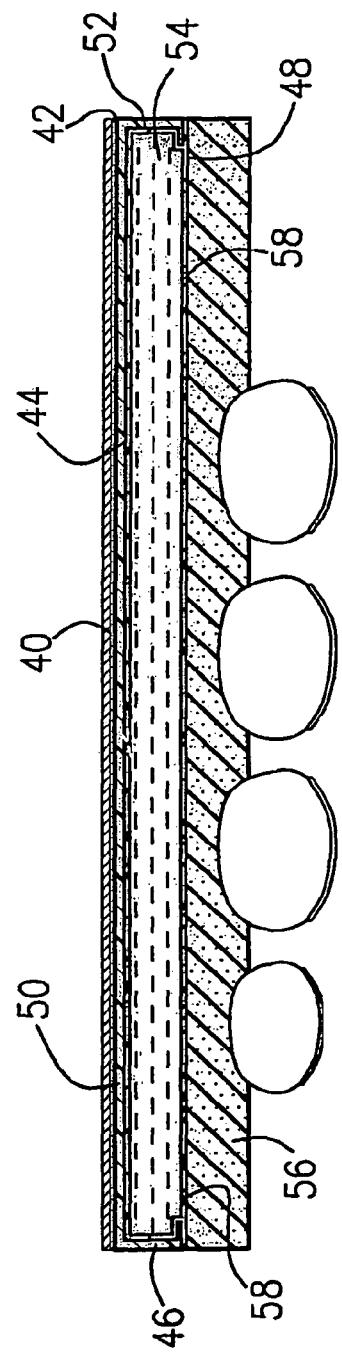
FIG. 14 is a cross section view taken along the cross section line of FIG. 10.

FIGS. 10 and 14 show the operation of door plate dispenser 60 when it is deployed for use. Dispenser 60 is typically attached to door 40 at a location where door hand plates are usually positioned on entrance doors to restrooms. The dispenser is mounted on the door plate or directly on the door. In order to gain entry into the restroom, a user applies a pushing motion by placing hand 66 against applicator 56 which is part of applicator assembly 57. The force resulting from the pushing motion causes the door to open and also facilitates the flow of indicator liquid 54 such as a dye from reservoir 62 through cover perforations 58 and into contact with applicator 56. The part of the fingers or palm of the user's hand that contacts applicator 56 becomes stained with indicator liquid or dye. The dye, which is fast drying and water soluble, is removable by thorough washing with soap and water. If a user has washed his or her hands before leaving the restroom, there is no remaining visible stain area such as that shown in FIG. 8.

The invention has been described in detail with particular reference to certain preferred embodiments thereof, but it will be understood that variations and modifications can be effected within the spirit and scope of the invention. In this regard, while the foregoing descriptions relate to dispensers used with door handles and door plates, the inventive principles also encompass dispensers designed for use with door knobs. The same inventive concept is used with minor design modifications in structure. Thus, a dispenser designed for use with a door knob also includes a reservoir containing an indicator liquid. The reservoir is housed within a chassis which is attached to a surface of a door knob. The reservoir also has a perforated cover and a dye containing applicator which the user contacts when turning the door knob to enter a restroom. Moreover, other variations of the inventive device are usable with any type of door opening means that is contacted by a user's hand to gain entry into a restroom.

What is claimed is:

1. A device for depositing onto a hand surface a soap washable dye liquid as an indicator for detecting when the hand surface has been hygienically washed, said device being detachably mountable on a door handle and comprising:
   a. a chassis which is attachable to said door handle, wherein said chassis comprises:
      i. a pair of oppositely disposed side walls having inwardly projecting flange members positioned at each end of each side wall; and
      ii. a partition which is positioned between the side walls and is attached to each side wall at a location inward of said flange members, so as to form a first chamber on one side of said partition and a second chamber on the other side of said partition, both chambers being within said chassis; and b. a dye applicator assembly which is removably attached to said chassis.

2. The device of claim 1 wherein said applicator assembly is removably attached to said first chamber.

3. The device of claim 2 wherein part of said door handle is positioned within said second chamber.

4. The device of claim 2 wherein the applicator assembly comprises an applicator, a perforated cover for said applicator and a reservoir for a soap washable dye liquid.

5. The device of claim 4 wherein the applicator is a liquid absorbing material.

6. The device of claim 4 wherein the applicator is a sponge.

7. The device dispenser of claim 4 wherein the reservoir comprises a trough having a base, two oppositely disposed side walls attached to the base, and two oppositely disposed end walls attached to the base and to the side walls.

8. The device of claim 7 wherein the perforated cover is attached to the side walls and end walls of the reservoir.

9. A device for depositing onto a hand surface a soap washable dye liquid as an indicator for determining whether the hand surface has been hygienically washed, said device being detachably mountable on a door surface or on a push plate attached to a door surface and comprising:

a. a chassis which is attachable to said door surface or push plate; and b. an applicator assembly which is removably attached to said chassis wherein said applicator assembly comprises an applicator, a reservoir for the soap washable dye and a perforated cover for said reservoir, and wherein said reservoir comprises a trough having a base, two oppositely disposed side walls attached to the base, and two oppositely disposed end walls attached to the base and to the side walls.

10. The device of claim 9 wherein the chassis comprises:

a. a pair of oppositely disposed side walls having inwardly projecting flange members positioned at each end of each side wall; and b. a base which is positioned between the side walls and which is attached to each side wall.

11. The device of claim 9 wherein the chassis is attachable to said door surface or push plate with an adhesive material.

12. The device of claim 9 wherein the applicator is a liquid absorbing material.

13. The device of claim 9 wherein the perforated cover is attached to the side walls and end walls of the reservoir.

* * * * *